United States Patent [19]
Dodge et al.

[11] Patent Number: 6,061,870
[45] Date of Patent: *May 16, 2000

[54] BUSHING SYSTEM

[75] Inventors: David J. Dodge, Williston; Stefan W. Reuss, Burlington, both of Vt.

[73] Assignee: The Burton Corporation, Burlington, Vt.

[ * ] Notice: This patent issued on a continued prosecution application filed under 37 CFR 1.53(d), and is subject to the twenty year patent term provisions of 35 U.S.C. 154(a)(2).

[21] Appl. No.: 09/003,855

[22] Filed: Jan. 7, 1998

[51] Int. Cl.⁷ .................................. F16L 5/00; H02G 3/22
[52] U.S. Cl. .......................... 16/2.1; 411/132; 280/618; 280/633; 36/50.5
[58] Field of Search .......................... 16/2.1–2.5; 403/97, 403/96; 411/546, 136, 132, 143, 148; 280/607, 617, 618, 619, 626, 629, 633, 634; 36/50.5, 58.5, 58.6

[56] References Cited

U.S. PATENT DOCUMENTS

| | | | |
|---|---|---|---|
| 360,561 | 4/1887 | Clow | 411/132 |
| 639,765 | 12/1899 | Phipps | 411/132 |
| 1,527,915 | 2/1925 | Phelan | 411/132 |
| 3,678,535 | 7/1972 | Charles | 16/2.5 |
| 3,875,610 | 4/1975 | Wubbe et al. | 403/97 |
| 4,026,610 | 5/1977 | Neder et al. | |
| 4,352,528 | 10/1982 | Guimbretiere | |
| 4,922,573 | 5/1990 | Miller et al. | 16/2.1 |
| 4,979,760 | 12/1990 | Derrah | |
| 5,178,470 | 1/1993 | Unick | |
| 5,261,689 | 11/1993 | Carpenter et al. | 280/618 |
| 5,356,170 | 10/1994 | Carpenter et al. | 280/618 |

FOREIGN PATENT DOCUMENTS

| | | |
|---|---|---|
| 2 757 411 | 6/1998 | France |
| 195 09 629 | 8/1996 | Germany |
| WO 95/19205 | 7/1995 | WIPO |

*Primary Examiner*—Chuck Y. Mah
*Attorney, Agent, or Firm*—Wolf, Greenfield & Sacks, P.C.

[57] ABSTRACT

A bushing system for isolating movement of a rotatable member from a releasable fastener used to secure the member to a support structure. The rotatable member may be a strap and the support structure may include a wall of a boot or a binding. The bushing may include a shaft having, at one end, a network of rotation resistant radially extending teeth or interlocks that cooperates with a complementary network of interlocks provided in the support structure about a mounting hole. The interlocks may have rounded or angled sidewalls that converge at a tip to encourage the bushing and support structure to mesh together. The tip is preferably substantially pointed with a fine edge, a rounded edge or a substantially narrow flat edge. A bore through the shaft is adapted to receive a screw or other fastener for securing the bushing to the support structure at the mounting hole. The bushing extends through an opening in the strap mounting the strap for rotation relative to the support structure. Engagement of the interlocks renders the bushing nonrotatable, isolating the strap from the fastener so that strap rotation does not loosen the fastening connection.

41 Claims, 5 Drawing Sheets

BUSHING SYSTEM

BACKGROUND OF THE INVENTION

1. Field of the Invention

The present invention relates generally to a bushing system and, more particularly, to a bushing system for rotatably mounting a strap to a binding or a boot.

2. Description of the Art

Many devices include one or more members, such as a strap, that are releasably mounted for rotation. A screw and nut may be employed to releasably secure the strap while still permitting the desired rotation. Repeated movement of the strap, however, may inadvertently loosen the hardware. To isolate the rotatable strap from the fastener, it has been known to employ a bushing including a sleeve having an outer surface about which is mounted the strap and an inner bore through which the fastening screw passes. The strap does not act directly on the screw and, consequently, rotation of the strap does not loosen the fastening hardware.

Rotatable straps are commonly found in sports shoes or boots, such as in-line skates, ski boots, snowboard boots and the like, and in bindings for sports shoes or boots, such as snowboard bindings. For ease of understanding, but without limiting the scope of the invention, the inventive bushing system to which this patent is addressed is disclosed below particularly in connection with an arrangement for mounting a strap to a snowboard binding.

Binding systems for soft snowboard boots typically include one or more adjustable straps for securing the boot to the snowboard. Generally, a strap is rotatably mounted to the binding baseplate at one of several mounting locations to achieve a desired strap configuration. Strap rotation permits the strap to be readily positioned for stepping into and out of the binding, for adjusting binding strap comfort and support, and for collapsing the binding straps into a stowable configuration.

Generally, a strap is detachably secured to the baseplate by a screw that passes through holes in both the baseplate sidewall and the strap, and a lock nut that is threaded onto the screw. A concern has been raised that strap rotation acting directly on the fastening hardware may inadvertently loosen the connection.

An arrangement has been proposed for mounting a binding strap to a binding baseplate using a nonrotating bushing that rotatably supports and isolates the strap from the mounting hardware. As illustrated in FIG. 9, an end of the bushing 10 includes a plurality of discrete bosses 12 along its outer periphery that mate with a pair of diametrically opposed bosses 14 protruding from the outer surface 16 of the baseplate sidewall. Each boss 12, 14 has a flat tip requiring the bushing and corresponding sidewall bosses to be properly oriented so that they fully mate with each other when the bushing is attached to the baseplate. Additionally, when the baseplate includes several adjacent mounting holes, rotation of a strap 19 about one of the mounting holes may be impeded by the protruding bosses at an adjacent hole.

It is an object of the present invention to provide an improved bushing system that is self-aligning and isolates the strap from its mounting hardware without impeding strap rotation.

SUMMARY OF THE INVENTION

The present invention is a bushing system for isolating movement of a rotatable member from a releasable fastener used to secure the member to a support structure. Without limiting the invention, the rotatable member may be a strap and the support structure may include a wall of a boot or a binding. The bushing may include a shaft having, at one end, a network of rotation resistant radially extending teeth or interlocks that cooperates with a complementary network of interlocks provided in the support structure about a mounting hole. The interlocks may have rounded or angled sidewalls that converge at a tip to encourage the bushing and support structure to mesh together. The tip is preferably substantially pointed with a fine edge, a rounded edge or a substantially narrow flat edge. Engagement of the interlocks renders the bushing nonrotatable, isolating the strap from the fastener so that strap rotation does not loosen the fastening connection. A bore through the shaft is adapted to receive a screw or other fastener for securing the bushing to the support structure at the mounting hole. The bushing extends through an opening in the strap, preferably at an end thereof, mounting the strap for rotation relative to the support structure.

In one embodiment of the invention, the bushing system is comprised of a bushing that includes a first end, a second end and a shaft portion therebetween with an outer surface about which the member may be mounted for rotation. The shaft portion has a borehole through which a releasable fastener may extend. The system is further comprised of a support structure having at least one mounting hole for receiving the fastener extending through the bushing which may then be secured by a compatible locking member. The first end of the bushing is configured with a first network of radially extending interlock teeth, wherein each of said first network of radially extending interlock teeth includes a pair of sidewalls that converge into a substantially pointed tip. A portion of the support structure surrounding the mounting hole includes a second network of radially extending interlock teeth, wherein each of the second network of radially extending interlock teeth includes a pair of sidewalls that converge into a substantially pointed tip. The first network of radially extending interlock teeth engages with the second network of radially extending interlock teeth, preventing inadvertent loosening of the fastener when the member is rotated about the shaft portion. The substantially pointed tip of each interlock tooth, preferably, includes a fine edge, a rounded edge or a substantially narrow flat edge.

In another embodiment of the invention, the bushing system is comprised of a bushing that includes a first end, a second end and a shaft portion therebetween with an outer surface about which the member may be mounted for rotation. The shaft portion has a borehole through which a releasable fastener may extend. The system is further comprised of a support structure having at least one mounting hole for receiving the fastener extending through the bushing which may then be secured by a compatible locking member. The first end of the bushing is configured with a first network of interlock members. A portion of the support structure surrounding the mounting hole includes a second network of interlock members, wherein each of the second network of interlock members is substantially flush with or disposed below an outer surface of the support structure. The first network of interlock members engages with the second network of interlock members, preventing inadvertent loosening of the fastener when the member is rotated about the shaft portion.

In a further embodiment of the invention, a bushing system is provided for releasably mounting a snowboard binding strap for rotation to a snowboard binding. The bushing includes a first end, a second end and a shaft portion therebetween with an outer surface about which the snowboard binding strap may be mounted for rotation. The shaft portion has a borehole through which a releasable fastener may extend. The first end of the bushing is configured with a first network of radially extending interlock teeth, wherein each of the first network of radially extending interlock teeth includes a pair of sidewalls that converge into a substantially pointed tip. The snowboard binding includes a baseplate for mounting to a snowboard. The baseplate has at least one mounting hole for receiving the fastener extending through the bushing which may then be secured by a compatible locking member. A portion of the baseplate surrounding the mounting hole includes a second network of radially extending interlock teeth that is substantially flush with or recessed below an outer surface of the baseplate. Each of the second network of radially extending interlock teeth includes a pair of sidewalls that converge into a substantially pointed tip. The first network of radially extending interlock teeth engages with the second network of radially extending interlock teeth, preventing inadvertent loosening of the fastener when the snowboard binding strap is rotated about the shaft portion.

In another embodiment of the invention, a bushing system is provided for releasably mounting a strap for rotation to a boot. The bushing includes a first end, a second end and a shaft portion therebetween with an outer surface about which the member may be mounted for rotation. The shaft portion has a borehole through which a releasable fastener may extend. The first end of the bushing is configured with a first network of radially extending interlock teeth, wherein each of the first network of radially extending interlock teeth includes a pair of sidewalls that converge into a substantially pointed tip. The boot shell has at least one mounting opening for receiving the fastener extending through the bushing which may then be secured by a compatible locking member. A portion of the boot shell surrounding the mounting opening includes a second network of radially extending interlock teeth that is substantially flush with or recessed below an outer surface of the boot shell. Each of the second network of radially extending interlock teeth includes a pair of sidewalls that converge into a substantially pointed tip. The first network of radially extending interlock teeth engages with the second network of radially extending interlock teeth, preventing inadvertent loosening of the fastener when the strap is rotated about the shaft portion.

Other objects and features of the present invention will become apparent from the following detailed description when taken in connection with the accompanying drawings. It is to be understood that the drawings are designed for the purpose of illustration only and are not intended as a definition of the limits of the invention.

BRIEF DESCRIPTION OF THE DRAWINGS

The foregoing and other objects and advantages of the invention will be appreciated more fully from the following drawings in which.

DETAILED DESCRIPTION

Figure 1:
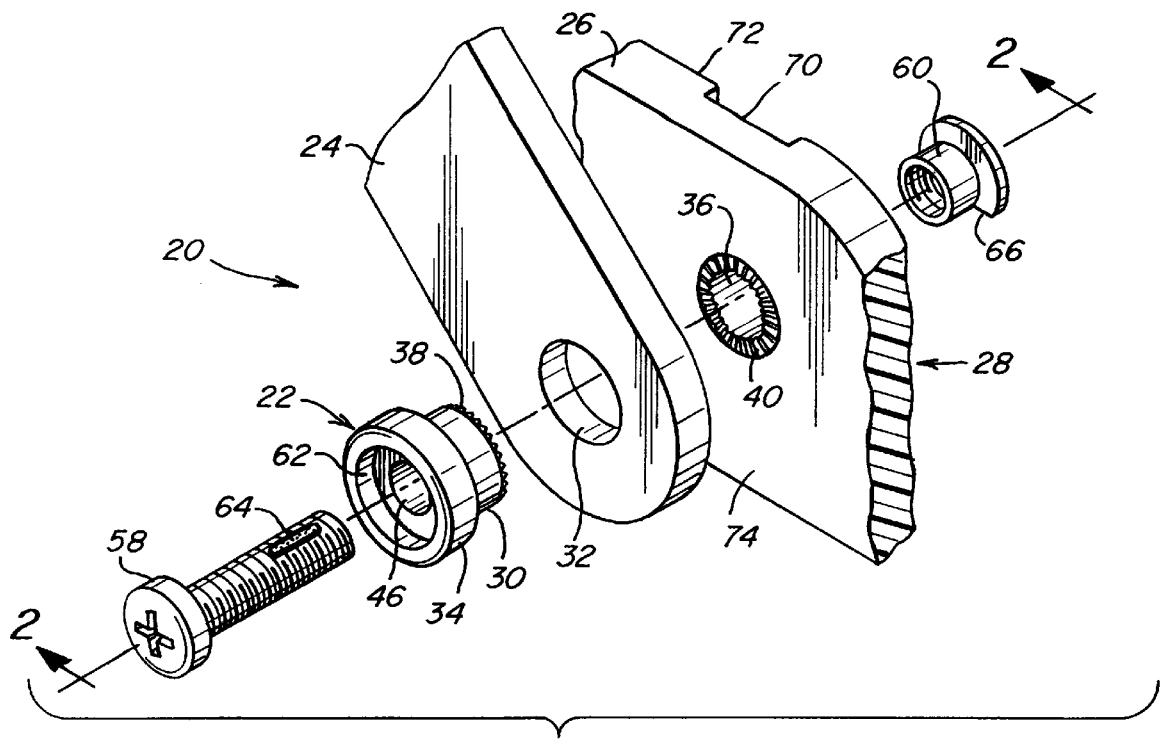
FIG. 1 is an exploded view of a non-loosening bushing system according to one embodiment of the present invention.

In one illustrative embodiment of the invention shown in FIGS. 1–4, a bushing system is provided for rotatably mounting a member, such as a strap, to an article. The bushing 22 is preferably interlocked with the article 28, isolating the strap 24 from its fastening hardware so that strap rotation relative to the article does not inadvertently loosen the connection between the strap 24 and the article 28. In one embodiment, the bushing 22 includes an interlock that cooperates with a corresponding interlock provided at a mounting hole 36 on the article wall 26. As illustrated, the bushing 22 may include a plurality of interlock members 38 projecting in an axial direction from the distal end of the shaft 30 that mate with a plurality of complementary interlock members 40 provided at the mounting hole 36.

Figure 3:
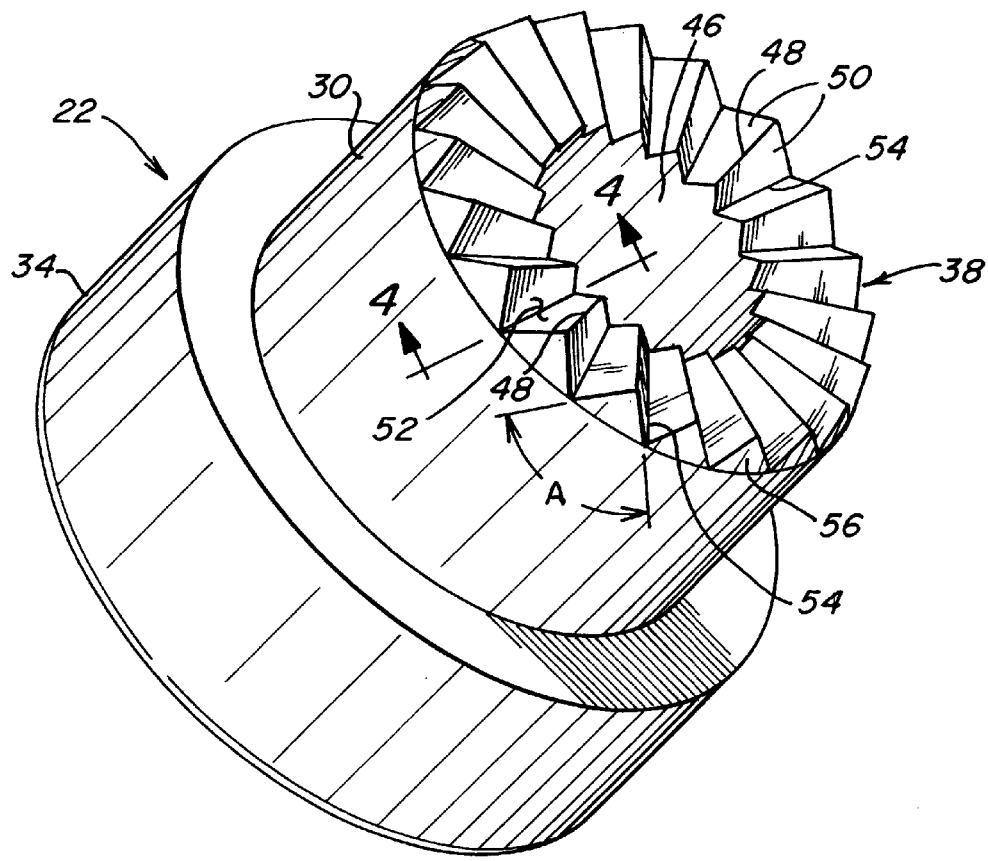
FIG. 3 is a perspective view of one illustrative embodiment of a bushing for the non-loosening bushing system of FIGS. 1–2.
Figure 4:
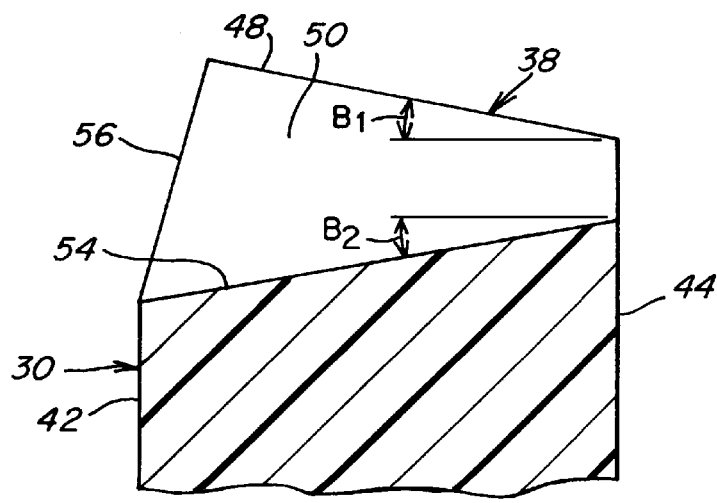
FIG. 4 is a cross-sectional view taken along section line 4—4 of FIG. 3.

In one illustrative embodiment shown in FIG. 4, the bushing interlock members 38 include teeth, splines, ribs or the like that extend in a radial direction across the distal end of the bushing. Similarly shaped interlock members 40 are provided about the mounting hole 36 on the article. The bushing interlock members 38 preferably extend from the outer periphery 42 of the shaft to its inner periphery 44 defined by a borehole 46 (FIG. 3) through the bushing, and the article interlock members 40 preferably extend outwardly from the periphery of the mounting hole 36 to an outer periphery that may be approximately equal to or greater than the diameter of the outer periphery 42 of the shaft to provide a relatively large interlocking surface area between the bushing and the article wall. It is to be appreciated, however, that the interlock members 38, 40 on the bushing and/or the article wall may be configured to partially extend between the outer periphery 42 and the inner periphery 44 of the bushing shaft.

The interlock members 38, 40 on the bushing 22 and article 28 may be radially disposed teeth with a substantially pointed tip or ridge 48 and rounded or angled sidewalls 50 that facilitate positioning of the bushing with the mounting hole 36 to ensure that the bushing interlock fully engages the complementary interlock on the article. As illustrated in FIG. 3, each bushing tooth 38 may have a generally triangular shape with angled sidewalls 50 that converge from the shaft 30 of the bushing toward the tip 48. The triangular shaped teeth 38 form similarly shaped recesses or troughs 52 between adjacent teeth that receive the complementary article teeth 40 to interlock the bushing and the article. The article teeth 40 are similarly shaped. As illustrated in FIG. 4, the tip 48 of each tooth and the bottom 54 of each trough are angled $B_1$, $B_2$ in opposite radial directions relative to horizontal planes perpendicular to the axis of the borehole 46 so that the height of each tooth 38 and trough 52 decreases in the radial direction from the outer periphery 42 toward and the inner periphery 44 to ensure proper engagement between the teeth 38,40 of the bushing and the article.

Figure 5A:
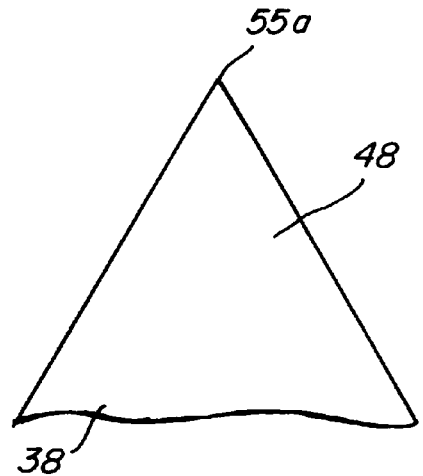
FIGS. 5A–5C are schematic illustrations of several interlock member tip configurations.
Figure 5B:
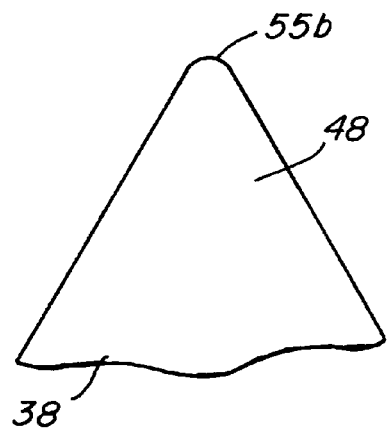
Figure 5C:
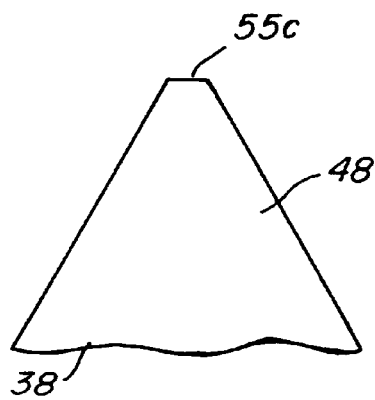

The sidewalls of the teeth 38, 40 cooperate with each other in a cam-type arrangement so that, even when the bushing and article teeth are initially oriented tip-to-tip, the bushing 22 rotates and aligns itself with the mounting hole 36 as the bushing is tightened against the article wall 26 to ensure that the teeth fully engage each other. The substantially pointed tip 48 of each tooth may include a fine edge 55*a* (FIG. 5A), a rounded edge 55*b* (FIG. 5B), a substantially narrow flat edge 55*c* (FIG. 5C) or similarly shaped edge to ease the alignment between the bushing and the baseplate. The outer edge 56 of the bushing teeth 38 may be chamfered to ease insertion of the bushing 22 through the strap 24. It is to be appreciated that other suitable teeth configurations may be implemented for aligning and locking the bushing to the article, such as sine wave type shapes for the teeth and troughs.

Figure 2:
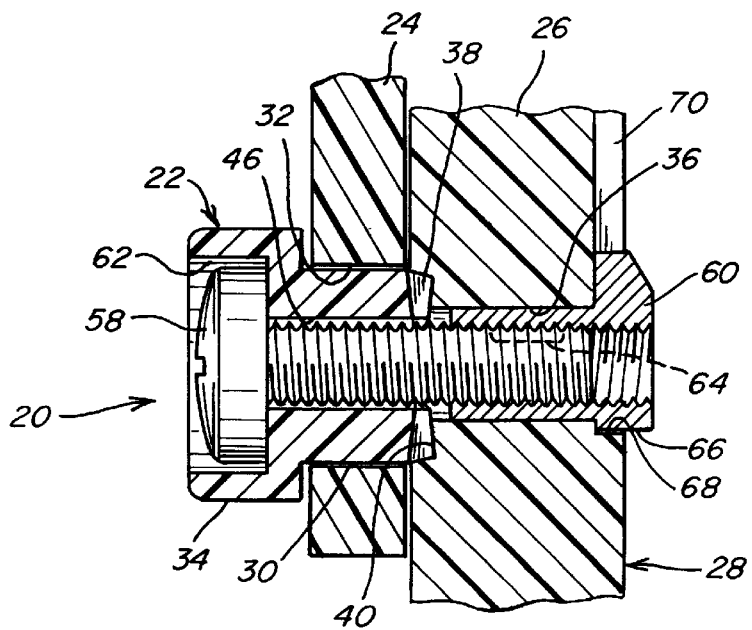
FIG. 2 is a cross-sectional view taken along section line 2—2 of FIG. 1 illustrating the assembled non-loosening bushing system.

The interlock members 40 on the article wall, preferably, are configured to avoid impeding with strap rotation, particularly between the strap 24 and an adjacent mounting location. As illustrated in FIGS. 1–2, the article interlock members 40 may be recessed below or substantially flush with the outer surface 74 of the wall 26.

The bushing 22 includes an elongated shaft 30 that extends through a hole 32 at one end of the strap 24, rotatably supporting the strap thereon. The bushing 22 includes an oversized head 34 at an outer end of the shaft 30 for retaining the strap 24 on the shaft between the head 34 and the article wall 26. The shaft 30 preferably has a length that is greater than the strap thickness and a diameter that is less than the strap hole diameter to ensure that the strap does not bind and, instead, freely rotates on the bushing. The bushing 22, preferably, is removably attached to the article 28 so that the strap 24 may be selectively positioned at any one of several mounting locations on the article to configure the strap for a user's particular needs. The bushing 22 may be attached to the article wall 26 using any suitable fasteners, such as a screw 58 and a corresponding T-nut 60. As illustrated, the screw 58 extends through the bushing borehole 46 and threadedly mates with a portion of the nut 60 disposed in the mounting hole 36 to secure the bushing to the article. The head 34 of the bushing 22 may be configured with a counterbore 62 for receiving the head of the screw 58. The screw 58 may be provided with a locking patch 64, such as urethane, nylon or the like, to resist loosening from the nut 60 when subjected to vibrations or similar forces encountered during use of the article.

To facilitate strap mounting and detachment, the T-nut 60 may include an antirotation feature that allows the screw fastener 58 to be tightened and loosened using a single tool, such as a screwdriver. In an illustrative embodiment, the T-nut 60 includes a head with a flat edge 66 along a portion of its outer periphery that cooperates with a comparably shaped wall 68 (FIGS. 1 and 2) defined by a recess 70 on the inner surface 72 of the wall to prevent nut rotation. Other antirotation shapes may be used, such as a hexagonal nut head that cooperates with a hexagonal recess in the sidewall.

In one embodiment, the bushing shaft 30 has a length of approximately 4.5 mm and an outer diameter of approximately 10 mm for mounting a binding strap with a thickness of approximately 4 mm and a hole diameter of approximately 10.5 mm. The bushing head 34 has an outer diameter of approximately 13 mm for retaining the strap on the shaft. The bushing 22 and the article wall 26 each includes twenty interlock members 38, 40 with corresponding troughs 52 uniformly and continuously spaced about the borehole 46 and the mounting hole 36, respectively. The sides 50 of each tooth have an angle A therebetween from approximately 10° to approximately 80°, and preferably an angle of approximately 75°. Each tooth and trough has a height at its outer periphery of approximately 1 mm that tapers down to approximately 0.5 mm at its inner periphery. The tip 48 of each tooth may have a radius of approximately 0.2 mm. It is to be appreciated that these dimensions are exemplary and that the interlock members may be configured with any other suitable shapes and sizes as would be apparent to one of skill.

In one embodiment, the bushing 22 is injection molded from a plastic material, such as polyurethane. It is to be appreciated, however, that the bushing may be formed with any suitable material using any suitable manufacturing technique as would be apparent to one of skill.

The bushing system 20 of the present invention may be used to mount a member, such as a strap, to an article such as a sports apparatus including sports shoes or boots, in-line skates, ski boots, snowboard boots and the like, and bindings for sports shoes or boots, such as snowboard bindings. For ease of understanding, however, and without limiting the scope of the invention, the inventive bushing system 20 is now described below in connection with a snowboard binding.

Figure 6:
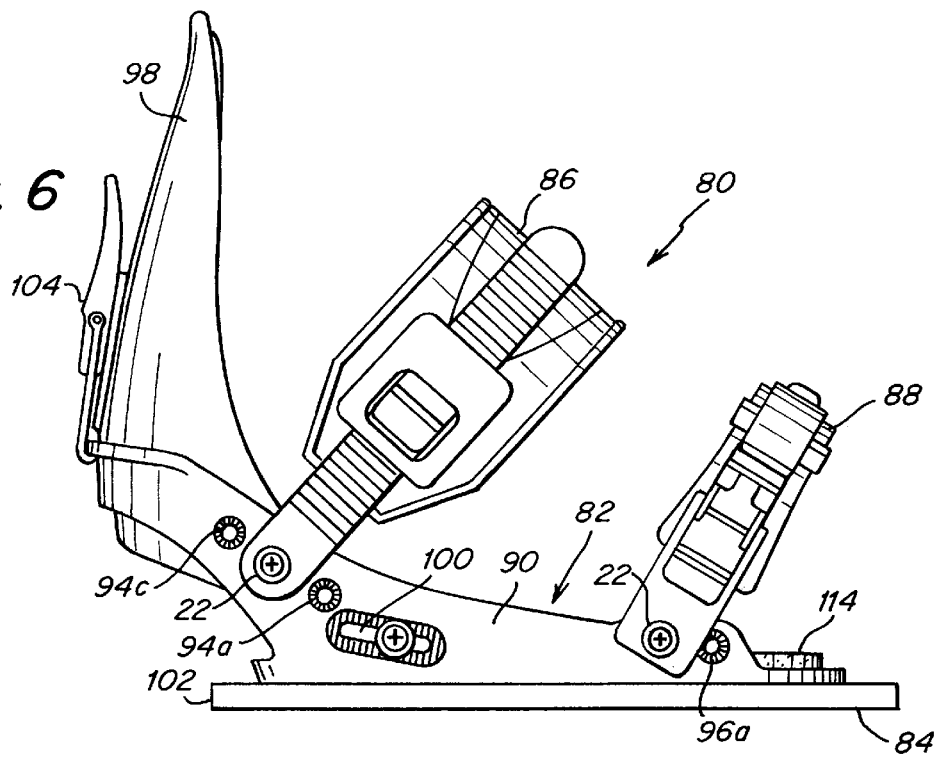
FIG. 6 is a side elevational view of a snowboard binding according to one embodiment of the present invention.
Figure 7:
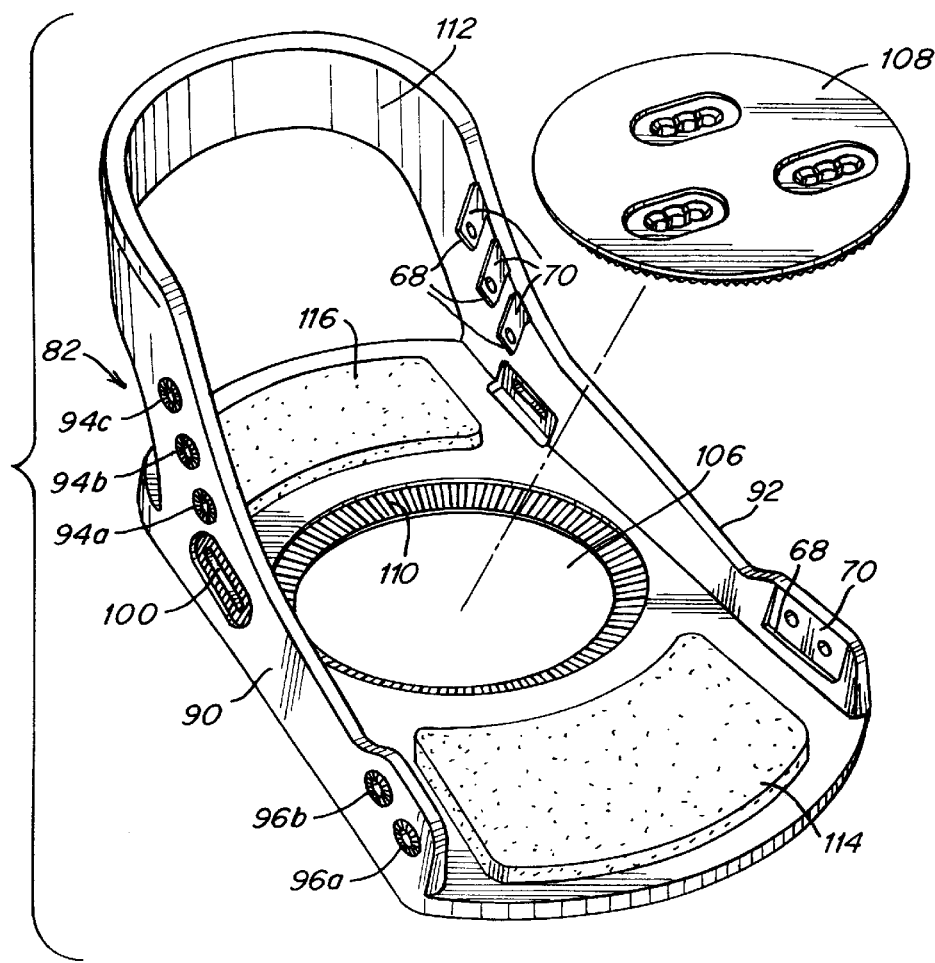
FIG. 7 is a perspective view of one illustrative embodiment of a baseplate for the snowboard binding of FIG. 1.

In an illustrative embodiment shown in FIGS. 6–7, the snowboard binding 80 may include a baseplate 82 that is mounted to a snowboard 84 and one or more binding straps 86, 88, preferably adjustable straps, that extend across portions of the baseplate for securing a boot (not shown) to the snowboard. Each strap may include one or more cooperating components, such as a toothed strap portion and a strap portion carrying a buckle, that allow the strap to be selectively tightened and loosened about the boot. As illustrated, the binding may include an ankle strap 86 that extends across the ankle portion of the boot to hold down the rider's heel and a toe strap 88 that extends across and holds down the front portion of the boot. Each strap is attached to opposing sidewalls 90, 92 of the baseplate by a bushing 22. It is to be understood that the binding may include a single binding strap, such as the ankle strap, or additional straps, such as a shin strap (not shown), and that the straps may be attached to other regions of the baseplate.

The baseplate 82 may include a plurality of strap mounting locations for both the ankle strap and the toe strap. In one embodiment, the baseplate sidewalls 90, 92 may include three strap mounting locations 94*a*, 94*b*, 94*c* for the ankle strap 86 that allow adjustment for lateral/medial flex, board response and comfort, and a pair of strap mounting locations 96*a*, 96*b* for the toe strap 88 that allow adjustment for boot size. For example, the ankle strap 86 may be positioned at either the bottom mounting location 94*a* for maximum medial flex, the middle mounting location 94*b* for an overall combination of flex, board responsiveness and heel holddown, or the top mounting location 94*c* for maximum heel hold-down with minimum flex.

As illustrated in FIG. 6, the snowboard binding may include a hi-back 98 that is pivotally mounted to the baseplate 82 for providing heelside support and heel edge control. The hi-back 98 may be mounted along elongated slots 100 in the sidewalls 90, 92 of the baseplate to allow hi-back rotation about an axis that is perpendicular to the snowboard upper surface. This allows the hi-back 98 to be maintained substantially parallel to the heel edge 102 of the board 84 at various baseplate stance angles for enhanced response in heelside turns. A lockdown forward lean adjuster 104 may also be provided to set the hi-back 98 at a preselected forward lean angle relative to the board 84 and to lock down the hi-back for enhanced toe-side response.

In one embodiment shown in FIG. 7, the baseplate may include a central opening 106 that is adapted to cooperate with a hold-down disc 108 for securing the baseplate 82 to the snowboard 84. A plurality of locking members 110, such as splines, ribs or the like, surrounding the periphery of the baseplate opening 106 mate with complementary features on the hold-down disc 108 so that the baseplate 82 may be rotated about an axis normal to the board 84 and secured in any one of numerous stance angles. The baseplate sidewalls 90, 92 may extend around the rear portion of the baseplate to form a heel cup 112 that is configured to receive and hold down the heel of a snowboard boot. An example of a snowboard binding baseplate and hold-down disc is described in U.S. Pat. Nos. 5,261,689 and 5,356,170, which are assigned to The Burton Corporation and are incorporated herein by reference.

The baseplate 82 may be anatomically configured for receiving left foot and right foot boots. As illustrated in FIG. 7, the baseplate 82 is specifically configured for a right foot boot. A left foot baseplate would be configured as a mirror image to the right foot baseplate. Resilient pads 114, 116 may be provided at the toe and heel portions of the baseplate to absorb shock and reduce chatter between the board and the rider.

In one embodiment, the baseplate 82 is injection molded from a suitable plastic material, such as polycarbonate or similar high strength material. It is to be appreciated, however, that the baseplate may be formed with any suitable material using any suitable manufacturing technique as would be apparent to one of skill.

Figure 8:
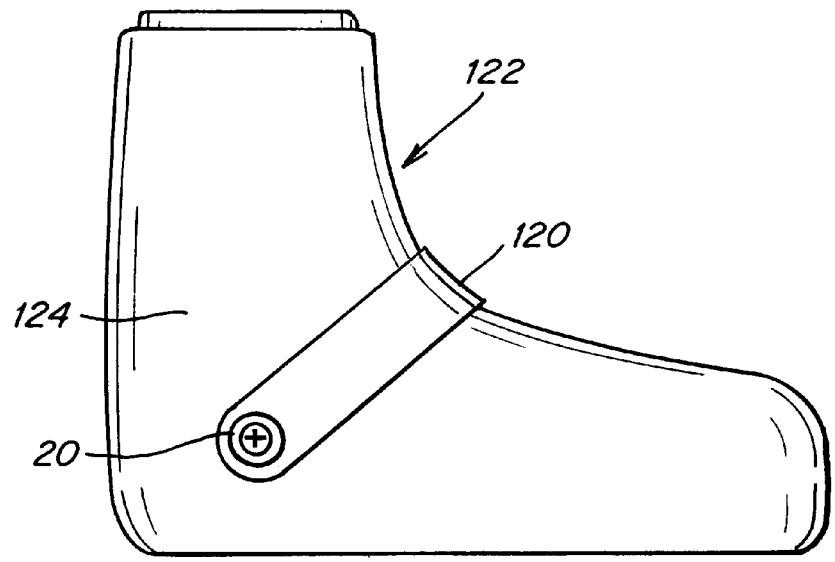
FIG. 8 is a side elevational view of a boot according to one embodiment of the present invention.
Figure 9:
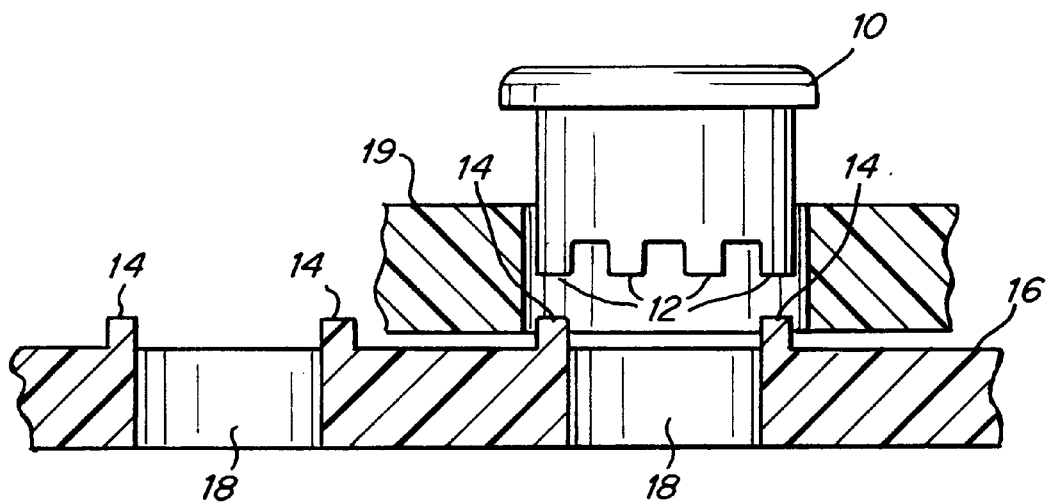
FIG. 9 illustrates a proposed binding strap mounting arrangement.

In another embodiment, the bushing system 20 may be used to mount a strap to a boot shell for snowboard boots, ski boots, in-line skates, and the like. As illustrated in FIG. 8, an ankle strap 120 for extending across a portion of the boot 122 to hold down a wearer's heel may be mounted to a boot shell 124 by the bushing system 20.

Having described several embodiments of the invention in detail, various modifications and improvements will readily occur to those skilled in the art. Such modifications and improvements are intended to be within the spirit and scope of the invention. Accordingly, the foregoing description is by way of example only and is not intended as limiting. The invention is limited only as defined by the following claims and their equivalents.

What is claimed is:

1. A bushing system comprising:
   a bushing including a first end, a second end and a shaft portion therebetween, said shaft portion including an outer surface and having a borehole through which a releasable fastener may extend, said first end of said bushing being configured with a first network of radially extending interlock teeth, wherein each of said first network of radially extending interlock teeth includes a pair of sidewalls that converge into a substantially pointed tip;
   a support structure having at least one mounting hole for receiving the fastener extending through said bushing, a portion of said support structure surrounding said mounting hole including a second network of radially extending interlock teeth, wherein each of said second network of radially extending interlock teeth includes a pair of sidewalls that converge into a substantially pointed tip; and
   a member rotatable mountable about said outer surface of said shaft portion, wherein said first network of radially extending interlock teeth engages with said second network of radially extending interlock teeth, preventing inadvertent loosening of the fastener when said member is rotated about said shaft portion.

2. The bushing system recited in claim 1, wherein the substantially pointed tip of each radially extending interlock tooth includes a fine edge.

3. The bushing system recited in claim 1, wherein the substantially pointed tip of each radially extending interlock tooth includes a rounded edge.

4. The bushing system recited in claim 1, wherein the substantially pointed tip of each radially extending interlock tooth includes a substantially narrow flat edge.

5. The bushing system recited in claim 1, wherein adjacent teeth of said first network of radially extending interlock teeth are contiguous and adjacent teeth of said second network of radially extending interlock teeth are contiguous.

6. The bushing system recited in claim 1, wherein said pair of sidewalls for each of said first and second networks of radially extending interlock teeth has an angle therebetween from approximately 10° to approximately 80°.

7. The bushing system recited in claim 6, wherein said angle is approximately 75°.

8. The bushing system recited in claim 1, wherein each of said sidewalls includes a cam surface, said cam surfaces of said first and second networks of radially extending interlock teeth cooperating with each other to align said bushing and said mounting hole so that said first and second networks of radially extending interlock teeth fully engage with each other when said bushing is secured to said support structure.

9. The bushing system recited in claim 1, wherein said first network of radially extending teeth extends across at least a portion of said first end of said bushing between said borehole and said outer surface of said shaft portion.

10. The bushing system recited in claim 9, wherein each of said first network of radially extending interlock teeth includes an inner edge and an outer edge, said inner edge being defined by said borehole and said outer edge being adjacent said outer surface of said shaft portion.

11. The bushing system recited in claim 10, wherein said outer edge of each of said first network of radially extending interlock teeth includes a chamfer.

12. The bushing system recited in claim 9, wherein said second network of radially extending interlock teeth extends across at least a portion of said support structure between said mounting hole and said outer surface of said shaft portion.

13. The bushing system recited in claim 12, wherein each of said second network of radially extending interlock teeth includes an inner edge and an outer edge, said inner edge being defined by said mounting hole and said outer edge being disposed adjacent said outer surface of said shaft portion.

14. The bushing system recited in claim 1, wherein each interlock tooth of said first and second networks of radially extending interlock teeth has the same shape.

15. The bushing system recited in claim 14, wherein each interlock tooth of said first and second networks of radially extending interlock teeth has an outer edge and an inner edge, each interlock tooth having a height that decreases in a direction from said outer edge toward said inner edge.

16. The bushing system recited in claim 14, wherein said first and second networks of radially extending interlock teeth have equal numbers of interlock teeth.

17. The bushing system recited in claim 1, wherein said second network of radially extending interlock teeth are substantially flush with or recessed below an outer surface of said support structure.

18. The bushing system recited in claim 1, wherein said bushing includes a head disposed at said second end, said member to be retained between said head and said support structure.

19. The bushing system recited in claim 18, wherein said member has a thickness, said head being spaced from said support structure by a distance therebetween that is not less than said member thickness to allow rotation of said member on said bushing.

20. The bushing system recited in claim 18, wherein said head of said bushing has a counterbore for receiving a head of the fastener.

21. The bushing system recited in claim 1, wherein said support structure is a snowboard binding baseplate for being mounted to a snowboard, said second network of radially extending interlock teeth being disposed on a sidewall of said snowboard binding baseplate, and wherein said member is a snowboard binding strap that extends across a portion of said snowboard binding baseplate.

22. The bushing system recited in claim 1, wherein said support structure is a boot shell and said member is a boot strap extending across a portion of said boot shell.

23. A bushing system comprising:
a bushing including a first end, a second end and a shaft portion therebetween, said shaft portion including an outer surface and having a borehole through which a releasable fastener may extend, said first end of said bushing being configured with a first network of interlock members;
a support structure having at least one mounting hole for receiving the fastener extending through said bushing, a portion of said support structure surrounding said mounting hole including a second network of interlock members, wherein each of said second network of interlock members is substantially flush with or disposed below an outer surface of said support structure; and
a member rotatably mountable about said outer surface of said shaft portion, wherein said first network of interlock members engages with said second network of interlock members, preventing inadvertent loosening of the fastener when said member is rotated about said shaft portion.

24. The bushing system recited in claim 23, wherein each of said first and second network of interlock members includes a cam surface, said cam surfaces of said first and second networks of interlock members cooperating with each other to align said bushing and said mounting hole so that said first and second networks of interlock members fully engage with each other when said bushing is secured to said support structure.

25. The bushing system recited in claim 23, wherein said first network of interlock members extends across at least a portion of said first end of said bushing between said borehole and said outer surface of said shaft portion.

26. The bushing system recited in claim 25, wherein each of said first network of interlock members includes an inner edge and an outer edge, said inner edge being defined by said borehole and said outer edge being adjacent said outer surface of said shaft portion.

27. The bushing system recited in claim 26, wherein said outer edge of each of said first network of interlock members includes a chamfer.

28. The bushing system recited in claim 25, wherein said second network of interlock members extends radially across at least a portion of said support structure between said mounting hole and said outer surface of said shaft portion.

29. The bushing system recited in claim 28, wherein each of said second network of interlock members includes an inner edge and an outer edge, said inner edge being defined by said mounting hole and said outer edge being disposed adjacent said outer surface of said shaft portion.

30. The bushing system recited in claim 23, wherein each interlock member of said first and second networks of interlock members is a triangular-shaped tooth.

31. The bushing system recited in claim 23 wherein each interlock member of said first and second networks of interlock members has the same shape.

32. The bushing system recited in claim 31, wherein each interlock member of said first and second networks of interlock members has an outer edge and an inner edge, each interlock member having a height that decreases in a direction from said outer edge toward said inner edge.

33. The bushing system recited in claim 31, wherein said first and second networks of interlock members have equal numbers of interlock members.

34. The bushing system recited in claim 23 wherein each interlock member of said first and second networks of interlock members has a substantially pointed tip.

35. The bushing system recited in claim 23, wherein said bushing includes a head disposed at said second end, said member to be retained between said head and said support structure.

36. The bushing system recited in claim 35, wherein said member has a thickness, said head being spaced from said support structure by a distance therebetween that is not less than said member thickness to allow rotation of said member on said bushing.

37. The bushing system recited in claim 35, wherein said head of said bushing has a counterbore for receiving a head of the fastener.

38. The bushing system recited in claim 23, wherein said support structure is a snowboard binding baseplate for being mounted to a snowboard, said second network of interlock members being disposed on a sidewall of said snowboard binding baseplate, and wherein said member is a snowboard binding strap that extends across a portion of said snowboard binding baseplate.

39. The bushing system recited in claim 23, wherein said support structure is a boot shell and said member is a boot strap extending across a portion of said boot shell.

40. A bushing system for releasably mounting a snowboard binding strap for rotation to a snowboard binding, said bushing system comprising:
a snowboard binding strap;
a bushing including a first end, a second end and a shaft portion therebetween, said shaft portion including an outer surface about which the snowboard binding strap may be mounted for rotation and having a borehole through which a releasable fastener may extend, said first end of said bushing being configured with a first network of radially extending interlock teeth, wherein each of said first network of radially extending interlock teeth includes a pair of sidewalls that converge into a substantially pointed tip; and
a snowboard binding including a baseplate for mounting to a snowboard, said baseplate having at least one mounting hole for receiving the fastener extending through said bushing, a portion of said baseplate surrounding said mounting hole including a second network of radially extending interlock teeth that is substantially flush with or recessed below an outer surface of said baseplate, wherein each of said second network of radially extending interlock teeth includes a pair of sidewalls that converge into a substantially pointed tip;
wherein said first network of radially extending interlock teeth engage with said second network of radially extending interlock teeth, preventing inadvertent loosening of the fastener when the snowboard binding strap is rotated about said shaft portion.

41. A bushing system for releasably mounting a strap for rotation to a boot, said bushing system comprising:

a boot strap;

a bushing including a first end, a second end and a shaft portion therebetween, said shaft portion defining an outer surface about which said boot strap may be mounted for rotation and having a borehole through which a releasable fastener may extend, said first end of said bushing being configured with a first network of radially extending interlock teeth, wherein each of said first network of radially extending interlock teeth includes a pair of sidewalls that converge into a substantially pointed tip; and a boot shell having at least one mounting opening for receiving the fastener extending through said bushing, a portion of said boot shell surrounding said mounting opening including a second network of radially extending interlock teeth that is substantially flush with or recessed below an outer surface of said boot shell, wherein each of said second network of radially extending interlock teeth includes a pair of sidewalls that converge into a substantially pointed tip;

wherein said first network of radially extending interlock teeth engage with said second network of radially extending interlock teeth, preventing inadvertent loosening of the fastener when said boot strap is rotated about said shaft portion.

* * * * *